United States Patent [19]

Nawrot

[11] 4,218,293
[45] Aug. 19, 1980

[54] ELECTROCHEMICAL APPARATUS AND PROCESS FOR MANUFACTURING HALATES

[75] Inventor: Chester R. Nawrot, Depew, N.Y.

[73] Assignee: Hooker Chemicals & Plastics Corp., Niagara Falls, N.Y.

[21] Appl. No.: 8,725

[22] Filed: Feb. 2, 1979

[51] Int. Cl.² .......................... C25B 1/26; C25B 9/00
[52] U.S. Cl. ................................. 204/95; 204/267; 204/269; 204/270; 204/286
[58] Field of Search .................. 204/95, 286, 267, 269, 204/270

[56] References Cited
U.S. PATENT DOCUMENTS

| | | | |
|---|---|---|---|
| 2,537,433 | 1/1951 | Waring | 204/38 E |
| 3,553,088 | 1/1971 | Grotheer et al. | 204/95 |
| 3,716,348 | 2/1973 | Perkins | 204/38 E |
| 3,779,889 | 12/1973 | Loftfield | 204/95 |

Primary Examiner—R. L. Andrews
Attorney, Agent, or Firm—Howard M. Ellis; William G. Gosz; Peter F. Casella

[57] ABSTRACT

An apparatus for the manufacture of halate, such as sodium chlorate, includes an electrolytic cell having a plurality of anodes and cathodes, clearance passageways between which have electrolyte, hypohalite and gaseous electrolysis product, principally hydrogen, moving upwardly between them, an enclosure covering the tops of at least four such passageways and narrowing down to a passageway extending upwardly from the top of the enclosure and a downward passage for circulation of electrolyte which includes an upper baffled portion and a lower unbaffled portion, the unbaffled part being alongside the electrodes and extending to the bottom of the cell, from which electrolyte is drawn upwardly past the electrodes. Natural circulation due to gravity flow and density differences between the liquid electrolyte and that entrained in gas or having gas entrained in it is normally sufficient so that stirring or pumping means are not required. The invention provides a means for converting higher current density cells to lower current density cells so as to be more energy efficient. In such conversions additional anode-cathode units are installed between those already in place and gases generated from them are collected with gases generated from an adjacent originally present anode-cathode unit and are moved upwardly with entrained liquid through previously existing passages while other circulating electrolyte is moved downwardly, also through previously existing passageways, baffled and unbaffled. Other aspects of the invention relate to particular types of spacers between electrodes and to more energy efficient lower current density electrochemical processes for manufacturing sodium chlorate.

25 Claims, 4 Drawing Figures

ELECTROCHEMICAL APPARATUS AND PROCESS FOR MANUFACTURING HALATES

This application relates to an apparatus for the manufacture of halate, especially sodium chlorate. More particularly, it relates to such an apparatus, capable of efficiently operating at low current densities, which includes a greater number of electrode pairs than previously employed in cells of similar capacity and which operates at a lower current density. Such an apparatus may be made by modification of a higher current density electrochemical halate cell. The invention also relates to a process for effecting such conversion and for producing chlorate more efficiently at lower current densities.

Electrochemical apparatuses and processes for the manufacture of chlorates and particularly, for the manufacture of sodium chlorate, are well known and are widely employed commercially for making such compounds. It is known to produce chlorine and sodium hydroxide by the electrolysis of brine and to make sodium hypochlorite by reaction of such products when no diaphragms or membranes are utilized in an electrolytic cell and it is known that hypochlorite is convertible to sodium chlorate and sodium chloride, the latter or which may be recycled in the electrolytic proces.

In U.S. Pat. No. 3,732,153, granted May 8, 1973 to Cyril J. Harke, John C. Parkinson and John E. Currey, and assigned to Hooker Chemical Corporation, there is disclosed a chlorate cell in which monopolar dimensionally stable anodes are positioned about cathodes in units, gas- and liquid electrolyte-containing reaction product generated between the anodes and cathodes of such a unit are collected in an enclosure at the top of such units and are carried upwardly through a passageway, a gas is removed from the top of the cell and electrolyte is circulated downwardly through baffled passages to near the tops of the electrode units and then through non-baffled passageways between the units to the bottom of the cell, from whence it moves upwardly between the electrodes. The Harke et al. patent is the closest prior art known to the present inventor although the references cited during prosecution of the patent (U.S. Pat. Nos. 3,291,714; 3,475,313; 3,553,088; 3,574,095; and 3,657,102; and French Pat. No. 1,284,779) may also be considered as relevant, to a limited extent.

The present invention is an important improvement over the apparatuses and processes of U.S. Pat. 3,732,153 when, as now, conservation of electrical energy is vital. It provides means for ready production of a lower current density chlorate cell of higher operating efficiency at the same current rating as the Harke et al. cell which may be of substantially the same cell design except for modifications in the numbers of electrodes or electrode units and in the constructions of enclosures and some passageways for circulation of electrolyte through the cell. By means of the present invention much of the same structure and materials utilized for making the Harke et al. cell may be employed in the construction of the present cells and the Harke et al. type cells may be modified and converted to cells within the present invention, if so desired.

In accordance with the present invention an apparatus for the manufacture of a halate will comprise an electrolytic cell including a plurality of monopolar dimensionally stable anodes and cathodes in spaced and paired relationship with one another, said anodes being holdable to the cell at a side thereof and being removable from the cell through a side thereof, means for applying positive and negative electrical potentials to the anodes and cathodes, respectively, and means for moving electrolyte in the cell so that it conducts current between the anodes and the cathodes of the anode-cathode pairs, passes between the anodes and cathodes of the pairs and is at least partially electrolyzed thereby to hypohalite and gaseous electrolysis product, which means for moving the electrolyte include clearance passageways between anodes and cathodes of the pairs for conducting such hypohalite, electrolyte and gaseous electrolysis product upwardly, an enclosure covering the tops of at least four such passageways between anode and cathode pairs and narrowing down to a passageway less than 1/10 the horizontal cross-sectional area of such enclosure and extending upwardly from it to an upper part of the cell, which enclosure and upwardly extending passageway guide gas and liquid moving upwardly from the clearance passageways, and a passage to conduct hypohalite downwardly past baffles to a lower portion of the cell, said passage containing said hypohalite for a long enough period of time during operation of the cell to convert a substantial proportion thereof to halate, means for withdrawing halate-containing liquor from the cell after it has descended through the baffled passage to the lower portion of the cell, means for feeding halide to the cell to replace that consumed in the preparation of withdrawn halate and means for withdrawing a gaseous product of electrolysis from the upper part of the cell. Also within the invention is the utilization in chlorate cells of circulating means which pass the gas-product-electrolyte mixtures from between at least four anode-cathode pairs or at least two units, each containing two anode-cathode pairs, upwardly in the cell through a single passageway. Additionally, the invention relates to: methods of converting higher current density chlorate cells of the Harke et al. type to lower current density cells; lower current density electrochemical processes for the manufacture of chlorate; improved spacers employed to maintain the desired separation or clearance between anodes and cathodes in such cells; and anode supports.

The invention will be readily understood by reference to the accompanying drawing and the present description, including the working examples and the following explanation of the drawing, in which.

Figure 1:
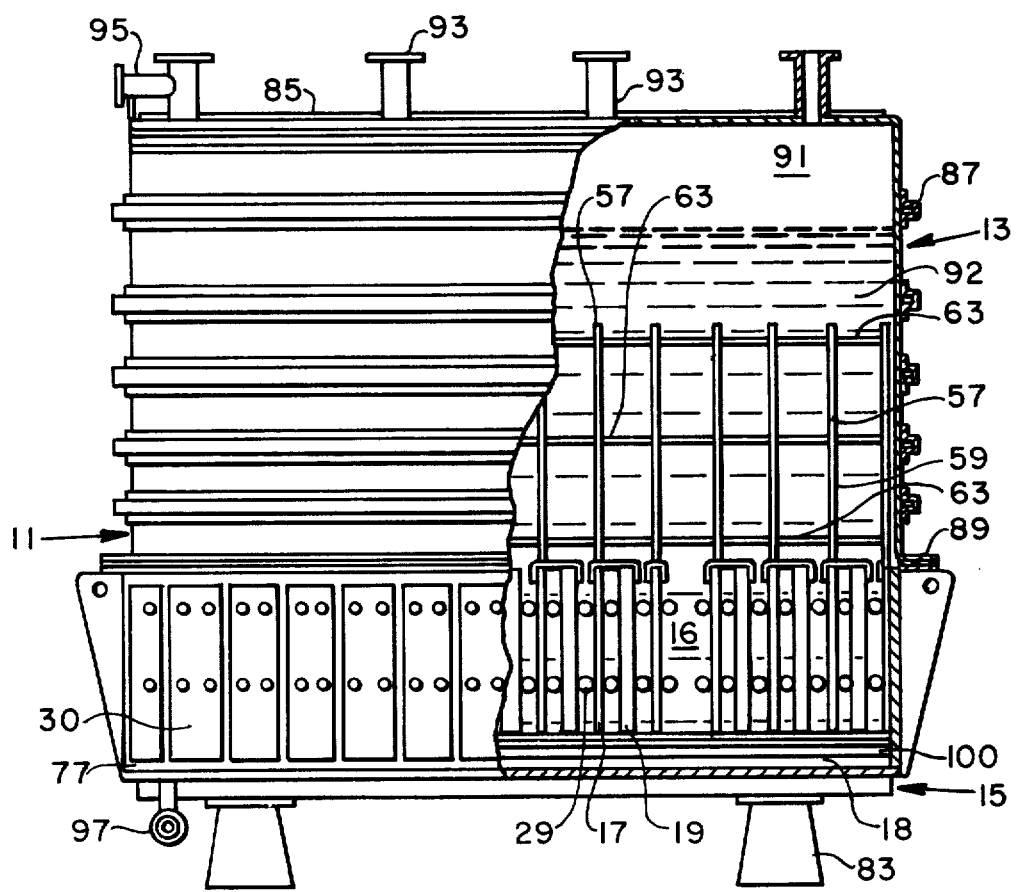
FIG. 1 is a partially cutaway and sectioned side elevational view of an electrochemical cell of this invention.
Figure 2:
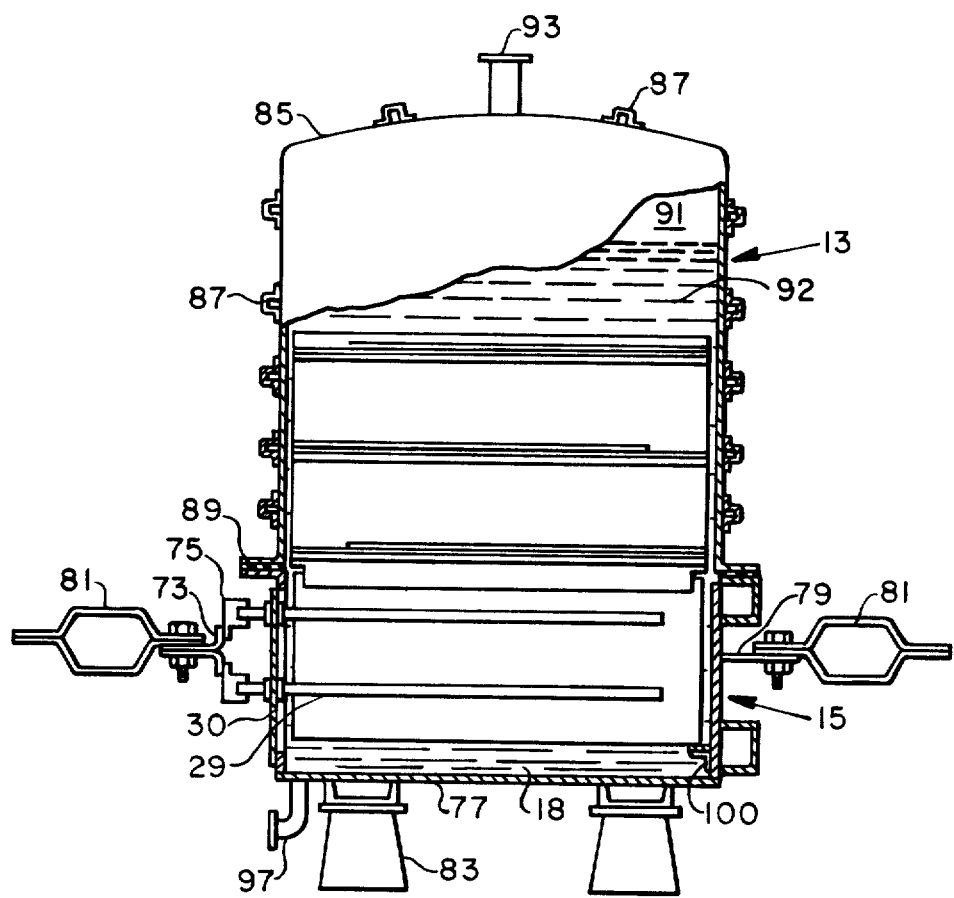
FIG. 2 is a partially cutaway and sectioned end elevational view of the cell of FIG. 1, with electrical connectors shown.
Figure 3:
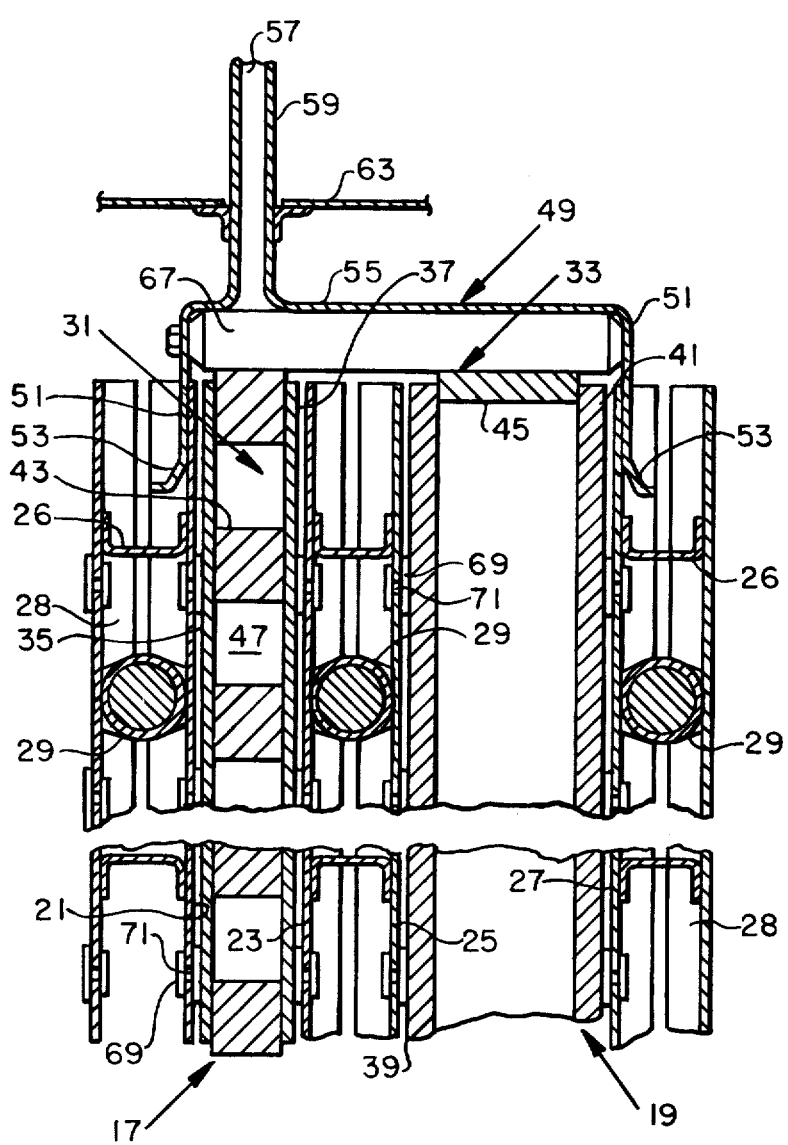
Figure 4:
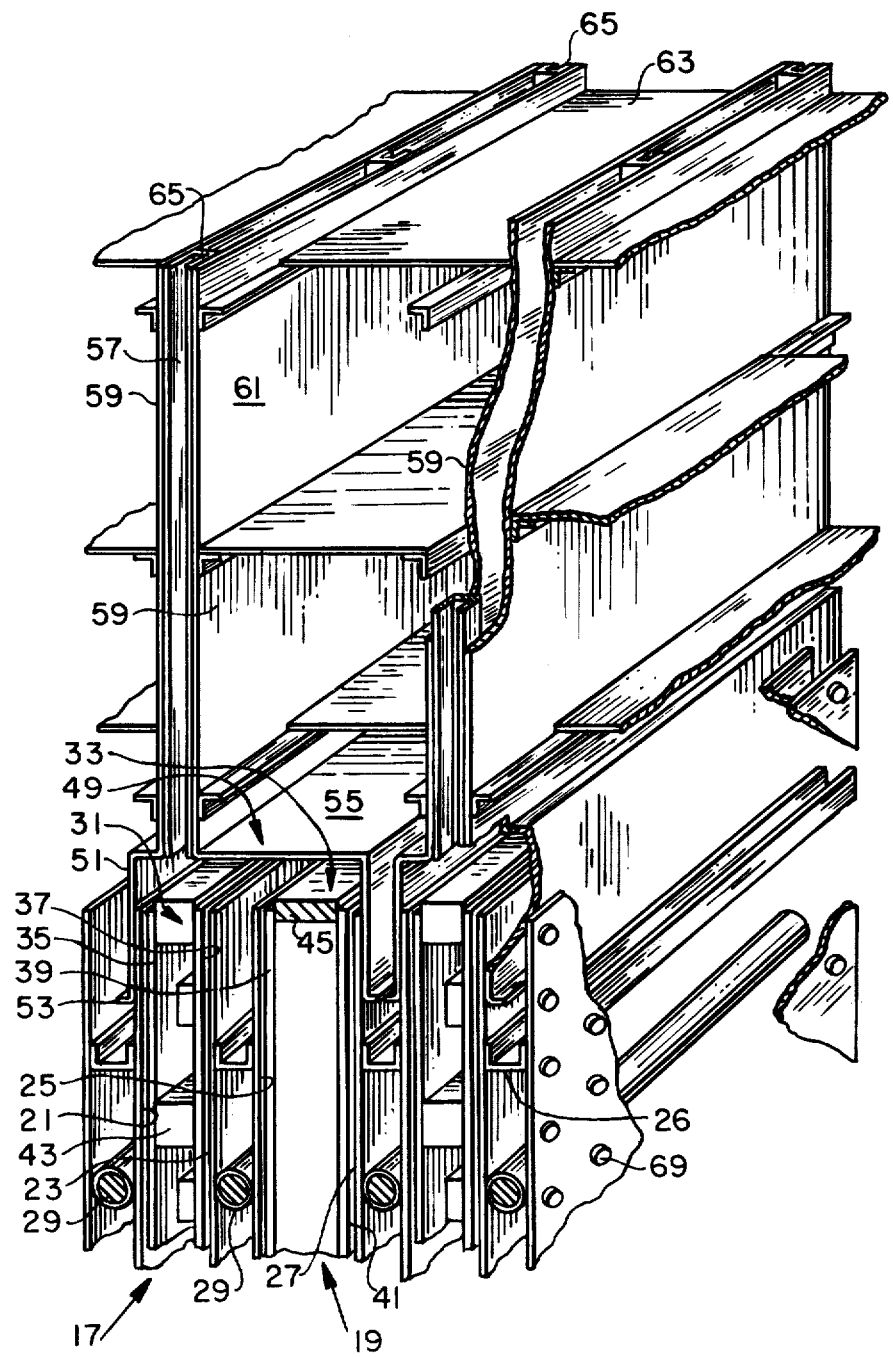

FIG. 3 is an enlarged view of portions of anode-cathode assemblies of FIG. 1, showing a covering enclosure and an upwardly leading passageway which, in combination, serve to convey electrolyte and gas upwardly from spaces between anodes and cathodes of a plurality of electrode units thereof; and FIG. 4 is a modified perspective view of parts of several pairs of anode-cathode assemblies and circulating means, showing passageways for upward flow of gas-containing reaction products and for downward flow of electrolyte.

In the following description of the illustrative apparatus of the invention, where reference is made to the production of sodium chlorate from an aqueous solution of sodium chloride it will be evident that this is for the purpose of simplicity of description because it is possible to make other halates, such as potassium chlorate and sodium bromate, by similar methods with the same or similar apparatuses and therefore it should be considered that the description also applies to apparatuses and processes for making halates.

Electrochemical cell 11, as shown in FIG. 1, may be considered to be composed of an upper section 13 and a lower section 15. The upper section is primarily for the retention of hypochlorite and electrolyte and for conversion of the hypochlorite to chlorate by a time reaction. The bottom portion, which may be considered as being the electrolytic portion, is for electrolysis of brine (an aqueous solution of sodium chloride) to hydrogen, chlorine and sodium hydroxide, the latter two of which react to form hypochlorite. Also, in the larger spaces 16 and 18, respectively, between inactive electrode surfaces and beneath the electrodes, conversion of hypochlorite to chlorate may also take place. Electrolytic units 17 and 19 each include anodes 21 and 23 for the one unit and 25 and 27 for the other, which anodes may be in sheet or plate form. Such anodes are strengthened by horizontal channels 26 and have anode conductors 29 welded to their inactive sides, which also helps to rigidify the anode. The anodes are bent along vertical corners to form ends 28, which further stiffen them. They are also supported on ledges 100, of steel angle iron as shown, covered on the top thereof with an insulating material, preferably, a synthetic organic polymer, most preferably polytetrafluoroethylene (Teflon®). The anodes and the attached channels and conductor rods are removable from the cell at sides thereof by unfastening plates 30 and withdrawing held anode assemblies. Although solid sheet anodes may be employed, and normally are made primarily of a valve metal coated with noble metal on the active side thereof, perforated metals, expanded metals and screens may also be used and in the present description are considered to be interchangeable with smooth surfaced anodes and sheets where such are described. Also materials of construction for the anodes may be changed to suitable substitutes. Anode conductor rods 29 normally extend horizontally and will preferably be titanium clad over a copper core.

The anodes of each "unit" are located about cathode sub-assemblies 31 and 33, in which cathodes 35 and 37 for sub-assembly 31 and 39 and 41 for subassembly 33, respectively, are joined together by means of internal wall-spacers 43 and 45, respectively. In cathode sub-assembly 31 open spaces 47 are for circulation of cooling water, when desired and it is preferred that such water move through such sub-assembly from bottom to top in generally horizontal paths, moving from one space to another through vertical openings or passageways through or at the ends of spacers 43. Additionally, a heat exchanger (not illustrated) may be present in the cell top section if warranted. A titanium tube exchanger is preferred and the coolant, usually water, can also circulate through the cathodes (and anode conductors, etc., when employed).

Atop a pair of adjacent electrode units, each of which includes two anodes and two cathodes and in which each of the anode-cathode pairs defines a clearance passageway in which electrolyte is electrolyzed, there is positioned enclosure 49 comprising a vertical wall 51 having an outwardly flaring bottom portion 53, a horizontal "ceiling" 55 and an upwardly extending passage 57 defined by vertical walls 59. Enclosure 49 encloses or covers a pair of units 17 and 19 and collects gas and upwardly circulating electrolyte and reaction product from said units and from the passageways between the reactive electrodes thereof and directs such materials upwardly through passage 57. As is seen by reference to FIG. 4 passage 57 and walls 59 are parts of the upper section of the electrochemical cell and are between baffled passage 61 thereof, defined by walls 59 and baffles 63, together with vertical channel members 65, which give the assembly strength.

In FIG. 3 supporting member 67, held to enclosure 49 in the interior thereof, is shown resting on cathode spacer-supports 43 and 45, joined to enclosure wall 51 and in contact with enclosure cover or ceiling 55. Through such enclosure parts the cathodes, which are held to the cell walls, support the enclosure and baffle structure. Member 67 is an insulator, preventing short circuiting of electrodes and also serves to maintain a desired distance between the cathodes, subassembly top and the riser passageway structure for passage upwardly of reaction products and electrolyte. It is preferably a synthetic polymer, e.g., Trovidur HT (PVDC).

To maintain the desired distance between anodic and cathodic surfaces and thereby help to better regulate voltage drop between anodes and cathodes the present invention preferably utilizes synthetic organic polymeric buttons 69, which preferably are mounted on the anodes by insertion through openings 71 therein. Such "buttons" are preferably of an inert polymer of good physical characteristics for the application, such as polytetrafluoroethylene, sold under the trade name Teflon, and have "heads" of controlled thickness so as to regulate the electrode gap by bearing against both anode and cathode. Preferably such gap will be thereby and otherwise regulated so as to be from 0.05 to 0.4 cm., preferably 0.08 to 0.32 cm. and most preferably about 0.15 to 0.25 cm.

Electricity is conducted to the present cell via conductor 73, connectors 75 and anode conductors 29 and is transmitted from the cell via its conductive wall 77, usually of steel, and connectors 79 and 81. The cell is supported on concrete piers 83 and has a top 85 of titanium, like that described in U.S. Pat. No. 4,039,420. The walls of the top section of the cell, especially if of synthetic plastic material, which is sometimes employed, may be reinforced with horizontal channels or ribs 87. The upper cell section 13 is held to the cell bottom section 15 by flanged connections 89.

In operation the cell is charged with sodium chloride solution at the desired concentration, usually saturated and acidic, cooling water is circulated through the cathodes and/or through a titanium tube type heat exchanger in the cell top, if desired, and the current is turned on. In the reaction or clearance spaces between the anodes and cathodes sodium hydroxide, chlorine and hydrogen are generated and the sodium hydroxide and chlorine react to produce sodium hypochlorite. The hydrogen and the aqueous sodium hypochlorite rise past the electrodes, entrained in one another, are directed by the enclosure covering the tops of the reactive clearance passageways to the riser passage (one riser passage for each four or more reactant passageways, as illustrated), to the top of the cell where the gas fills gas space 91 above electrolyte liquid 92 and the liquid proceeds to travel downwardly through the baffled passages. Some gas is removed through outlet 95, which also serves for nitrogen purging. Makeup feed is charged through inlet fitting 93. The sodium hypochlorite solution, which is at first dilute, is returned downwardly to the cell bottom past the baffles and through opening 16 between inactive electrode surfaces of electrode units and by other paths at sides and ends of the cell. Desirably at least 20% and preferably 30 to 90% of the hypochlorite passing downwardly through the baffled passageway is converted to chlorate in one pass. After sufficient circulation of electrolyte past the electrodes the concentration of sodium chlorate produced from the hypochlorite intermediate product is high enough to allow withdrawal of some such solution as product. Such withdrawal may be effected through drain line 97. A portion of the amount withdrawn may be mixed with saturated sodium chloride solution, resaturated by addition of sodium chloride crystals, acidified with hydrochloric acid, chlorine or a mixture thereof, heated or cooled, as desired (with cooling usually being effected), and returned to the cell near the top, as through fitting 95, or at the bottom thereof, if desired. The process is run continuously in such manner but it may also be batch operated. In other embodiments of the invention sodium chloride and acid are added to the electrolyte feed back to the cell and no chlorate solution removed from the cell is returned to it (except after chlorate removal).

Under preferred conditions of operation the current density is maintained at 0.28 to 0.40 ampere per square centimeter, e.g., 0.35 ampere/sq. cm., the potential is of 2.8 to 3.1 volts, e.g., 3.0 volts, the concentration of sodium chloride in the aqueous electrolyte is maintained at from about 100 to 150 grams per liter, e.g., 130 grams/liter, and the temperature is in the range of 50° to 85° C., preferably 60° to 85° C. and most preferably about 80° C., so that in the event of minor changes therein the temperature will not exceed 85° C. The pH of the electrolyte will be maintained at about 6 to 6.5 by the addition of hydrochloric acid or chlorine to the returning electrolyte so that such returning electrolyte will have a pH of about 4 to 5. Current efficiencies obtained are about 93 to 97% on a continuous basis and are often superior to current efficiencies obtained in continuous commercial practice with higher current densities, e.g., 0.6 to 1 ampere per square centimeter. However, the real superiority of the present operation is in its lower voltage which leads to significant savings of electric power.

It has been found that to obtain useful circulation in the present cells, when the clearance distances between active electrodes are in the 0.05 to 0.4 cm. width range, the linear velocity of liquid (exclusive of gas, except dissolved gas) past the electrodes (in the clearance passageway is desirably in the range of 0.5 to 7 meters per second, preferably being from 4 to 6 meters per second, and the preferred linear velocity through the downward baffled passages is 1 to 20%, preferably 3 to 10% thereof. The velocity through the passageways below the baffled passageway and between inactive electrodes from the bottom of the baffled passageways to the bottom of the cell normally and preferably are from 10 to 100%, more preferably 20 to 60% of the linear velocity of the electrolyzed liquid moving upwardly between the active electrodes. To regulate such linear velocities the total cross-sectional area of the inactive passageways between the electrodes will usually be from 10 to 100%, e.g., 40% of the total of the cross-sectional areas of the active clearance passageways. Thus, the widths of such areas, when from 20 to 200 active passageways are present and when from 2 to 15 larger downwardly passageways are present, will usually be in the range of from 5 to 100 times the active clearance passageway width. Normally from 5 to 50 enclosures, each over from 2 to 4 electrode units containing from 4 to 8 clearance passageways between anode and cathode pairs will be present. Preferably from 10 to 20 enclosures and from 2 to 5 larger passageways will be utilized. The proportion of larger passageways to electrode units (each unit containing two anode-cathode pairs) will normally be in the range of 1:4 to 1:10. Also, to help maintain desired flow the cross-sectional area of the upwardly directed passages from the enclosures will be from 2 to 10%, preferably from 4 to 8% and more preferably about 6% of the cross-sectional areas of the enclosures, said cross-sectional areas being measured horizontally (as is the case for measuring such areas of clearances and passageways previously mentioned).

The present invention results in substantial advantages over the prior art when electrical energy conservation is a prime consideration. It has been found when operating at lower current densities, such as those herein described, that lower voltages may be utilized and by increasing the area of active electrolytic surfaces the same chlorate production can be obtained. The savings in electricity, often a small proportion and sometimes only a few or several percent, are substantial over lengthy periods, often being in the hundreds of thousands of dollars per year for relatively small cell houses. The efficiency of operation can be raised by operating at temperatures in the range given and especially in the upper part of such range but care will be taken to avoid having continuous operating temperatures exceed 85° C. because at such temperatures oxygen production may sometimes exceed the desired limit of 3% by volume of the hydrogen made. Similarly if circulation speeds are increased unduly the percentage of chlorine will also be increased objectionably beyond the 2 or 3 percent limit (gas percentages are measured by volume).

Although the present cells are for low current density operation, when necessary they may be operated at higher current densities, thereby increasing chlorate production and giving the chlorate plant a higher degree of flexibility to respond to demand. When cells of the present type are constructed they may be comparatively easily modified by removal of alternate electrode units and shortening of the enclosures so as to cover only the remaining units. Then, should electrical energy no longer be a seriously limiting factor, such cells may be operated at higher current densities and the removed electrodes, if desired, may be employed in other cells. Similarly, and as is more often the case, existing cells of the Harke et al. type may be readily converted to low current density cells by addition of electrode units between those present, coupled with extension of the enclosures. When such modifications are made it is noted that the widths of the alternate or second electrode units to be installed may be such that there is no need for additional spacers between the units because the anode conductors function as such spacers. Such modifications between cells of the high and low current density types may be made with substantially no changes in the upper cell portions, including the tops, baffles and riser passages, and little or no change in the tank of the bottom section, the supports therefor and the original electrode units thereof. The "new" electrode units being installed may have the cathode sub-assemblies wider than usual and of heavier walls because of the absence of internal supports but they will usually be made lighter than the "original" electrode units so as to diminish cell weight, to minimize the need for modification of the cell box and electrode supports and also because cooling effected by passage of coolant within the original cathode sub-assemblies, may often be sufficient, due to lower EI losses, so that additional cooling will not be required. If more cooling is desirable it may be effected elsewhere in the cell, e.g., the cell top, with an additional heat exchanger or the second cathode sub-assemblies may be modified to provide for internal cooling.

The modified enclosure over a plurality of electrode units does not result in diminished flow of products of electrolysis through the riser passageway because by lowering the current density to approximately half that previously employed, while increasing the active electrode surface proportionally, essentially the same quantity of electrolysis product results as does when the "unmodified" Harke et al. cell is employed. The riser passageway, being directly above one electrode unit, despite the fact that it is asymmetrically mounted with respect to a pair or other plurality of such units, has products from the aligned electrode unit moved directly upwardly through the riser, helping to draw along products from the other such electrode unit. The asymmetric mounting on the enclosure allows for continued use of one complete side thereof, so that only one side has to be replaced and even that replacement can be effected by substitution of new skirt and flaring portions and extension of the roof portion of the already existing (in a Harke et al. structure) other side of the riser. In some instances, where desired, electrode or riser and enclosure positions may be adjusted so that the riser is symmetrically located with respect to the electrodes but such is not necessary and often may be undesirable, involving additional changes in cell structures. Similarly, the locations of the larger lower vertical passageways may be altered but it is preferred to have these symmetrically located away from the cell ends and separate from each other, e.g., separated by 20 to 50% of the electrode units present.

In addition to the basic improvements recited over prior art chlorate cells of similar types it should also be noted that the utilization of the present polymeric plastic spacing buttons provides an excellent method for regulating inter-electrode clearance distances and thereby promoting uniformity of electrolysis and electrochemical reaction. The buttons are easily installed, firmly held in place and provide a positive means for accurately setting distances beteen electrode working surfaces. It is preferred that they be installed through holes in the anode walls by insertion through such walls and by expansion of a non-critical side so as to maintain the buttons in place. Such expansion can be effected by: press-fusing such non-critical sides; thread fastening a "nut" onto a threaded shaft of the spacer passing through the anode wall opening; fusion of a cap onto the button shaft passing through the opening; or by other suitable means. The important aspect is to make the "button" side between the electrodes of desired uniform thickness and to have it held firmly in place against the active anode wall in pressing contact with the cathode.

Although various aspects of the electrolytic cell of this invention have been described other details of the construction may be found in U.S. Pat. No. 3,732,153, which is incorporated herein by reference to avoid unnecessary recitation of such details thereof. The subject material referred to includes various descriptions of materials of construction, fittings, assemblies and operations which will be evidently relatable to the present invention by one of skill in the art.

The following example illustrates the operation of the present apparatus in the production of sodium chlorate. However, the method described is illustrative only, the invention may be employed for making other halates and the processes described may be varied. In the example and in the specification and claims all parts are by weight and all temperatures are in °C. unless otherwise indicated.

EXAMPLE

An electrolytic cell (or electrochemical apparatus) of the type described in FIG'S. 1-4 is made by the described modification of a corresponding cell such as that of U.S. Pat. No. 3,732,153. The electrolytic cell measures approximately 1.2 by 2.4 meters and is about 2.4 meters high. It is equipped with platinum-iridium plated titanium anodes and with carbon steel cathodes and the anode conductors are titanium clad copper. The preferred coating on the titanium anode is a 70:30 platinum:iridium composition. The cell box is of carbon steel and the cell top is of titanium. The enclosure, riser passageway, baffles and baffled passages are of titanium.

A brine solution containing 140 g./l. of NaCl (in the 130-160 g./l. range) is circulated through the cell and fills the cell to a distance about 15 cm. from the top thereof. Such brine solution is subsequently employed as a makeup feed too. The feed rate is about 21 liters per minute, the takeoff of chlorate-containing liquor is the same and about 70% (60-80%) of the feed is recirculated material. The inlet temperature of the brine is about 55° C. (in the 40°-60° C. range) but it is soon heated up to cell operating temperature, which is such that the liquid drawn off from the cell is at about 80° C. (in the 50°-85° C. range). Chlorine gas is fed in with the makeup brine and sometimes with the recirculated electrolyte to acidify the liquor entering the electrolytic zone. Acidification of the feed is to a pH of about 5.2 (in the 4.8 to 5.7 range) so that the liquor drawn off has a pH of about 6.5 (in the 6.1 to 6.8 range).

After circulation of electrolyte has begun operation of the cell is started. The cell voltage is found to be about 3 volts (in the 2.9 to 3.2 volt range), with a current density of 0.35 ampere/sq. cm. (in the 0.28 to 0.4 ampere/sq. cm. range). When the circulating electrolyte has increased in sodium chlorate content to 450 g./l. (350-500 g./l. range) liquor is taken off at the bottom of the cell from that circulating and is made up with feed brine. Takeoff and makeup operations are conducted continuously. The liquor removed analyzes 130 g./l. of NaCl (120-150 g./l. range), 450 g./l. of $NaClO_3$ and 2.5 g./l. of NaOCl (2-4 g./l. range). Gas removed from the cell top portion of the apparatus, which contains about twice the volume of the active bottom section thereof, analyzes less than 1% of chlorine and less than 3% (2.3%) of oxygen, the balance being hydrogen.

Operations of the cell are continued and feeds and takeoffs are regulated so as to maintain electrolytic and electrochemical equilibria and to permit takeoff of cell liquor at the analysis indicated. Under such operating conditions it is found that cell efficiency is about 93% or better. The various component parts of the cell withstand well the operating conditions and the chemicals with which they come into contact, and repairs and replacements are not necessitated for periods of over a year.

Similarly, operations of the apparatus under other conditions previously described and under conditions like those of this example, modified as indicated previously, result in efficient productions of sodium chlorate and other metal chlorates.

The plastic button spacers are found to hold up well with use of the cell and accurately maintain spacings between electrodes and facilitate upward flow (they do not channel the electrolyte, as do vertical line spacers). In practice the buttons are usually circular, 0.8 to 1.5 cm. in diameter, and arranged in a regular staggered (or diamond) pattern about 8 to 20 cm. apart, e.g., 13 cm. apart. About 30 to 100 are used per anode-cathode pair, e.g., 55 in the present example.

The invention has been described with respect to various illustrations and examples thereof but is not to be considered as limited to these because it will be clear to one skilled in the art that equivalents and substitutes may be employed without departing from the spirit of the invention or going outside the scope thereof.

What is claimed is:

1. An apparatus for the manufacture of a halate which comprises an electrolytic cell including a plurality of monopolar dimensionally stable anodes and cathodes in spaced and paired relationship with one another, said anodes being holdable to the cell at a side thereof and being removable from the cell through a side thereof, means for applying positive and negative electrical potentials to the anodes and cathodes, respectively, and means for moving electrolyte in the cell so that it conducts current between the anodes and the cathodes of the anode-cathode pairs, passes between the anodes and cathodes of the pairs and is at least partially electrolyzed thereby to hypohalite and gaseous electrolysis product, which means for moving the electrolyte include clearance passageways between anodes and cathodes of the pairs for conducting such hypohalite, electrolyte and gaseous electrolysis product upwardly, an enclosure covering the tops of at least four such passageways between anode and cathode pairs and narrowing down to a passageway less than 1/10 the horizontal cross-sectional area of such enclosure and extending upwardly from it to an upper part of the cell, which enclosure and upwardly extending passageway guide gas and liquid moving upwardly from the clearance passageways, and a passage to conduct hypohalite downwardly past baffles to a lower portion of the cell, said passage containing said hypohalite for a long enough period of time during operation of the cell to convert a substantial proportion thereof to halate, means for withdrawing halate-containing liquor from the cell after it has descended through the baffled passage to the lower portion of the cell, means for feeding halide to the cell to replace that consumed in the preparation of withdrawn halate and means for withdrawing a gaseous product of electrolysis from the upper part of the cell.

2. An apparatus according to claim 1, for the manufacture of a chlorate, in which the passage for conducting hypohalite downwardly past baffles to a lower portion of the cell and for holding it for a long enough period of time to convert a substantial proportion thereof to chlorate in operation, holds the hypochlorite long enough to convert at least 20% thereof to chlorate in one pass through the passage and includes at least one passageway for downward movement of electrolyte which is below the baffles and is substantially larger than the clearance passageways between the anodes and cathodes of the anode-cathode pairs.

3. An apparatus according to claim 2, for the production of sodium chlorate, wherein there is present a plurality of the passageways substantially larger than the clearance passageways between the anodes and the cathodes of the anode-cathode pairs, which larger passageways are separated from each other and are located between electrodes of the same electrical sign, and said larger passageways pass the electrolyte containing sodium chlorate downwardly to the cell bottom from a greater number of baffled passages.

4. An apparatus according to claim 3 wherein cross-sectional areas of such larger passageways for downward movement of the electrolyte from the baffled section of the apparatus to the cell bottom are each from 5 to 100 times that of each of the clearances between anodes and cathodes and the total of the cross-sectional areas of the larger passageways is sufficient and such passageways are so located that during operation of the apparatus electrochemical production of sodium chlorate proceeds with sufficient natural circulation of electrolyte due to lifting thereof through the clearance passageways between the electrode pairs by gas produced at the cathodes and downward movement of the electrolyte containing sodium hypochlorite and sodium chlorate past the baffles and to the cell bottom through the larger passageways.

5. An apparatus according to claim 4 wherein at least four cathodes are covered by said enclosure covering the tops of at least four clearance passageways between anode and cathode pairs and said cathodes are positioned asymmetrically with respect to the passageway above the enclosure.

6. An apparatus according to claim 2 wherein there are present from 5 to 50 enclosures, each covering the tops of at least four clearance passageways between anode and cathode pairs, and from 2 to 15 larger passageways below the baffles and substantially larger than the clearance passageways between the anodes and cathodes of the anode-cathode pairs, and the cross-sectional areas of the narrowed passageways communicating with the enclosures and through which gaseous products of electrolysis, including hydrogen, pass upwardly with electrolyte, are from 2 to 8% of the cross-sectional areas of the enclosures.

7. An apparatus according to claim 6 wherein anodes and cathodes are held apart from each other by a plurality of insulating synthetic organic polymeric plastic buttons through one of the electrodes and contacting the other.

8. An apparatus according to claim 1 wherein at least four cathodes are covered by said enclosure covering the tops of at least four clearance passageways between anode and cathode pairs and said enclosure is supported by the cathodes asymmetrically with respect to the passageway above it.

9. An apparatus according to claim 8 wherein the cathodes asymmetrically support a supporting means and the supporting means is within the enclosure, is held to enclosure walls and supports it and the narrowed passageway through which gaseous product of electrolysis, which includes hydrogen, passes upwardly with electrolyte.

10. A supporting member for an anode for a halate cell according to claim 1 wherein the anode is mounted on one side of the cell which comprises a longitudinal ledge having an insulating material on the top thereof on which the anode rests.

11. A supporting member according to claim 10 wherein the insulating material is polytetrafluoroethylene.

12. A supporting member according to claim 11 wherein the ledge is the top of a longitudinally and horizontally extending angle of steel or iron which is fastened to the interior steel wall of the halate cell.

13. A supporting member for a side entering anode of an electrolytic cell according to claim 1 which comprises a longitudinally extending horizontal ledge having an upper surface of insulating material on which the anode rests.

14. A supporting member according to claim 13 wherein the insulating material is polytetrafluoroethylene.

15. An apparatus according to claim 1 wherein anodes and cathodes are held apart from each other by a plurality of insulating synthetic organic polymeric plastic buttons through one of the electrodes and contacting the other.

16. Anodes for a chlorate cell according to claim 1 having a plurality of polytetrafluoroethylene buttons piercing surfaces thereof with heads of said buttons facing outwardly so as to contact a matching cathode to maintain a clearance passageway between the anode and cathode and prevent short circulating thereof.

17. In an apparatus for the manufacture of halate, which comprises an electrolytic cell including means for positioning a plurality of anodes and cathodes in spaced and paired relationships with one another, means for applying positive and negative electrical potentials to the anodes and cathodes, respectively, and means for circulating electrolyte through the cell, the improvement which comprises an enclosure covering the tops of at least four anode-cathode pairs and the clearance passageways between them and communicating with a passageway narrower than the enclosure and extending upwardly from it, through which electrolyte and gaseous product of electrolysis from the at least four electrode pairs may circulate upwardly due to the lifting action of the gaseous product of electrolysis.

18. An improvement according to claim 17 wherein two anode-cathode pairs are present per unit, said unit includes two cathodic surfaces on a base structure and two anode sheets, one facing each of the cathodic surfaces, and said units are substantially separate from each other but are in mutual contact with anode conductors and have top portions thereof within the enclosure.

19. An improvement according to claim 18 wherein anodes and cathodes are held apart from each other by polytetrafluoroethylene buttons passing through the anodes at pluralities of locations thereon and contacting the cathodes.

20. In an apparatus for the manufacture of halate, which comprises an electrolytic cell including a plurality of anodes and cathodes, means for positioning them in spaced and paired relationship with one another, means for applying positive and negative electrical potentials to the anodes and cathodes, respectively, and means for circulating electrolyte through the cell, the improvement which comprises said anodes and cathodes being in units containing two anode-cathode pairs, which units include two inner cathodic surfaces on a base structure and two outer anode sheets, one facing each of the cathode surfaces and being held apart from them, with such units being spaced apart by anode conductors which conduct positive electrical charges to the anodes of the units.

21. A method for converting an apparatus for manufacture of halate, comprising an electrolytic cell including a plurality of monopolar dimensionally stable anodes and cathodes, means for positioning them in spaced and paired relationship within units comprising two anode-cathode pairs with two inner cathodic surfaces on a base structure and two outer anode surfaces, one facing each of the cathodic surfaces and separated from such surfaces, with enclosure means above each unit for trapping gas generated between the anodes and cathodes of the unit and transmitting it to a passageway through which it and electrolyte move upwardly and help to circulate electrolyte in the cell, to one capable of producing halate at the same rate and at a lower current density which comprises installing in said cell additional electrode units and replacing at least a portion of the enclosure means with an enlarged means for enclosing the tops of a plurality of such units, including an original and an added unit and having such enclosure for such plurality of units connect with an original single vertical passageway for circulation of generated gas and electrolyte upwardly through the cell.

22. A method according to claim 21 wherein any spacers between electrode units are removed and installed units are spaced apart from other such units by mutual anode connectors.

23. A method according to claim 22 wherein spacers are removed between at least two units without installation of an enlarged enclosure and an additional unit so as to provide an enlarged passageway for circulation of electrolyte downwardly through the cell.

24. A method of producing chlorate in a low current density chlorate cell which comprises electrolyzing aqueous sodium chloride solution to chlorine, hydrogen and sodium hydroxide and then converting such chlorine and such sodium hydroxide to sodium hypochlorite and then to sodium chlorate in the cell, which comprises passing a direct current through an aqueous electrolyte between anodes and cathodes 0.05 to 0.4 cm. apart at a current density of 0.28 to 0.4 ampere per square centimeter and a potential of 2.8 to 3.1 volts, while maintaining the concentration of sodium chloride in the aqueous electrolyte at from 100 to 150 grams per liter and the temperature thereof in the range of 50° to 85° C., removing products of electrolysis, including gas-entrained electrolyte, upwardly from the area of the electrodes and through a walled passageway to the top of a baffle return section of the electrolytic cell by means of a gravity flow differential force caused by gas entrainment with rising electrolyte, removing from the cell hydrogen gas containing less than 2% of chlorine and no more than 3% of oxygen, returning electrolyte to the bottom of the cell, by means of a baffled route, in which returning hypochlorite is converted to chlorate, withdrawing from the cell at the bottom thereof a portion of the electrolyte containing chlorate and adding substantially saturated aqueous sodium chloride solution or sodium chloride crystals to the cell to compensate for the materials removed therefrom.

25. A method according to claim 24 wherein the current density is about 0.35 ampere per square centimeter, the voltage is about 3 volts and the temperature is about 80° C.

* * * * *